United States Patent

Ma

[11] Patent Number: 5,915,354
[45] Date of Patent: Jun. 29, 1999

[54] STRATIFIED CHARGE ENGINE

[75] Inventor: Thomas Tsoi-Hei Ma, South Woodham Ferrers, United Kingdom

[73] Assignee: Ford Global Technologies, Inc., Dearborn, Mich.

[21] Appl. No.: 08/930,712

[22] PCT Filed: Apr. 3, 1996

[86] PCT No.: PCT/GB96/00832

§ 371 Date: Sep. 29, 1997

§ 102(e) Date: Sep. 29, 1997

[87] PCT Pub. No.: WO96/35045

PCT Pub. Date: Nov. 7, 1996

[30] Foreign Application Priority Data

Apr. 29, 1995 [GB] United Kingdom ............... 9508790

[51] Int. Cl.$^6$ .............. F02B 31/00; F02B 31/06
[52] U.S. Cl. ........................................ 123/308; 123/306
[58] Field of Search ............................ 123/308, 306, 123/188.14, 590, 592

[56] References Cited

U.S. PATENT DOCUMENTS

| | | | |
|---|---|---|---|
| 1,833,711 | 11/1931 | Goldsborough | 123/306 |
| 3,945,363 | 3/1976 | Elsbett et al. | 123/306 |
| 4,308,829 | 1/1982 | Yamada . | |
| 4,354,463 | 10/1982 | Otani . | |

FOREIGN PATENT DOCUMENTS

| | | | |
|---|---|---|---|
| 0 529 676 | 3/1993 | European Pat. Off. . | |
| 0 558 080 | 9/1993 | European Pat. Off. . | |
| 1526294 | 7/1969 | Germany . | |
| 38 28 742 | 3/1989 | Germany . | |
| 93 19 545 | 4/1995 | Germany . | |
| 54-103914 | 8/1979 | Japan . | |
| 60-47819 | 3/1985 | Japan . | |
| 1518560 | 10/1989 | U.S.S.R. | 123/308 |

*Primary Examiner*—Noah P. Kamen
*Assistant Examiner*—Jason Benton
*Attorney, Agent, or Firm*—Donald A. Wilkinson

[57] ABSTRACT

An intake system for an internal combustion engine is described having an intake port 120 divided by a twisted partition wall 123 into two helical channels 121, 111; 122, 112. The end of the partition wall 123 adjacent the intake valve 113 lies in a plane generally perpendicular to the stem of the intake valve 113 and the part of the partition wall 123 at the other end of the intake port 120 lying in a plane generally parallel to the stem of the intake valve 113.

9 Claims, 2 Drawing Sheets

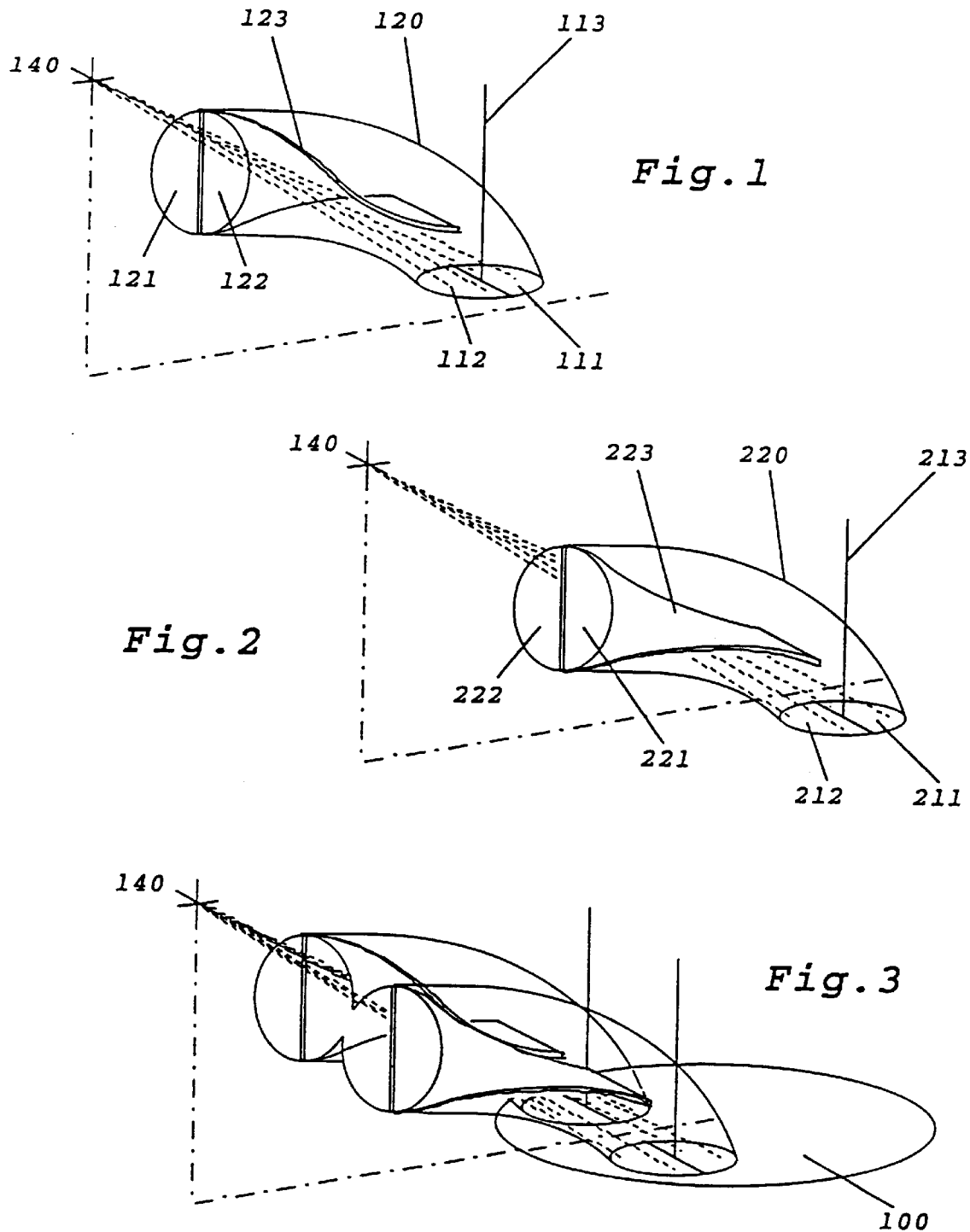

STRATIFIED CHARGE ENGINE

FIELD OF THE INVENTION

The present invention relates to a stratified charge engine.

BACKGROUND OF THE INVENTION

In a stratified charge spark ignition engine, steps are taken intentionally to ensure that the combustible charge is not homogeneous. The fuel is concentrated in one region of the charge while other regions have high concentration of air or EGR (exhaust gas recirculation) gases, depending on the design of the intake system.

This stratification may take place in different ways within the combustion chamber. The common forms of stratification are axial stratification in which the fuel concentrated at the top of the combustion chamber and radial stratification in which the fuel is concentrated near the central axis of the combustion chamber.

Other forms of stratification are created by causing the intake charge to tumble, that is to say rotate about an axis perpendicular to the cylinder axis. Such motion is not to be confused with swirl in which gases rotate about the axis of the cylinder, the latter normally resulting in radial stratification.

When tumble is promoted in the intake charge, stratification can occur in one of two ways. In one way, if the composition of the gases varies across the width of the combustion chamber, a sandwich-like structure with vertical layers is created that is referred to as vertical stratification, the vertical direction being taken as the axis of reciprocation of the piston.

The present invention is concerned with the other form of stratification produced by tumble, which is described in copending Patent Appln. No. 9505894.7 filed on Mar. 23, 1995 and is termed envelope stratification in that application. Here, the tumble produces a horizontal cylinder of one composition enveloped in a second outer layer having a different composition, the two layers tumbling in unison at right angles to the cylinder axis.

In order to produce radial stratification, the gases entering the combustion chamber can be split into two streams of different composition with the separation between them extending parallel to the stem of the intake valve. By aiming the gases tangentially into the combustion chamber, one stream can be directed to swirl near the cylinder wall while the other stream is directed towards the center of the cylinder. Envelope stratification, on the other hand, is produced by splitting the intake gases into two streams of different composition with the separation between them extending at right angles to the stem of the intake valve. The lower of the two streams is directed towards the center of the combustion chamber while the upper stream is directed towards the roof of the combustion chamber, the two streams then tumbling together at right angles to the cylinder axis.

Dividing an intake port by a partition extending at right angle to the valve stem presents a problem. Fuel needs to be introduced into the lower channel and should ideally be aimed at the intake valve. However, the presence of the partition hinders the line of sight access to the valve and it is not possible to position the fuel injector sufficiently near the intake valve in such a manner as to avoid wall wetting.

U.S. Pat. No. 4,308,829 describes an intake system for an internal combustion engine, having a cylinder head, an intake port in the cylinder head controlled by an intake poppet valve having a valve stem, and a twisted partition wall in the intake port dividing the intake port into two helical channels. The twisted partition wall in this patent is designed to promote swirl and its purpose is to make the gas stream rotate about the axis of the valve stem.

OBJECT OF THE INVENTION

The present invention seeks to provide an engine in which at its end adjacent the intake valve, each intake port is divided by a partition into two channels separated by a plane perpendicular to the stem of the intake valve, and in which it is possible to direct a jet of fuel on to the intake valve with minimal wetting of the partition and of the walls of the intake port.

SUMMARY OF THE INVENTION

According to a first aspect of the invention, there is provided an intake system for an internal combustion engine, said system having a cylinder head, an intake in the cylinder head controlled by an intake poppet valve having a valve stem, and a twisted partition wall in the intake port dividing the intake port into two helical channels characterized in that the plane of the partition wall at its end adjacent the intake valve lies generally perpendicular to the stem of the intake valve and the plane of the part of the partition wall at the other end of the intake port lies generally parallel to the stem of the intake valve.

The skewed or twisted partition in the invention allows the two streams to enter the intake port side by side and leave the intake port one above the other leaving a direct line of sight to inject fuel into the lower channel from an injector positioned outside the intake port.

The invention is applicable to stratification with air, stratification with exhaust gas recirculation (EGR) gases and stratification with both air and EGR gases in combination.

In the case of stratification with air the two streams could be supplied by the same intake manifold but it is preferred in all cases to draw the two streams from two separate manifolds as this gives greater control over both the flow rate and the composition of the two streams.

According to a second aspect of the invention, there is provided an internal combustion spark ignition engine, wherein each engine cylinder has at least one intake valve and each intake valve is supplied by an intake port divided by a partition wall into two intake port channels, a first intake port channel being provided with means for supplying a first flow stream directed across the roof of the combustion chamber and the second intake port channel being provided with means for supplying a second flow stream directed towards the center of the combustion chamber, the first flow stream being directed to separate the second flow stream from the roof of the combustion chamber as the two flows enter the combustion chamber and the two flows tumbling in unison to produce envelope stratification within the combustion chamber, characterized in that the partition wall divides the intake port into two channels of substantially equal flow cross sections, the partition wall lies parallel to the stem of the intake valve at the entrance of the intake port, and twists progressively through substantially 90° to lie at right angles to the stem of the intake valve at the end of the intake port nearer the intake valve, and a fuel injector is positioned to inject fuel to mix with the gases entering the combustion chamber through the second intake port channel, the fuel spray of the injector being aimed to enter the intake port to one side of the partition wall and to pass through the second intake port channel without significantly wetting the partition wall.

In a preferred embodiment of the invention, the two intake helical ports channels as described above are separately connected to respective intake manifolds controlled by respective flow regulating valves, the first manifold supplying air or exhaust gas recirculation (EGR) gases to the first channel and the second manifold supplying to the second channel a metered air flow into which fuel is introduced to give a predetermined air to fuel ratio in the second intake port channel, the flow through the first intake port channel being controlled to supply a first higher velocity flow stream directed across the roof of the combustion chamber and the flow through the second intake port channel being controlled to supply a second lower velocity flow stream towards the center of the combustion chamber.

The invention has the advantage that the fuel spray from the fuel injector is unobstructed by the initially vertical orientation of the partition such that the fuel injector may be located nearer to the intake valve and the fuel spray may be targeted at the head of the intake valve. As the fuel spray expands with the distance away from the fuel injector, the flow channels also turn progressively such that more and more horizontal width becomes available within the lower intake port channel to allow the expanding fuel spray to fill the entire lower half of the intake port.

Preferably, the shape of the twisted partition wall is designed such that it wraps around the expanding geometry of the fuel spray without the fuel wetting the surface of the partition wall.

This invention is particularly useful for application in an engine with two intake valves per cylinder designed to create envelope stratification within the combustion chamber by directing the two flow streams to tumble one on top of the other. The intake ports supplying the two intake valves may be siamesed at one end and a single fuel injector may be mounted in the plane of symmetry of the siamesed section of the intake port to deliver a fuel spray toward each intake valve. In this case the second intake port channels are siamesed and located between the two initially vertically partitioned first intake port channels, the partitions being turned progressively in a symmetrical manner about a plane of symmetry between the two intake ports until they become horizontally orientated at the ends of the intake ports.

The fuel injector may in this case be targeted at the intake valve heads with substantially the same orientation as in a conventional engine without port partition, thereby allowing implementation of the invention by making relatively minor modifications to intake systems of conventional design.

Another advantage of the invention stems from the twisted geometry of the partition wall acting as a flow deflector. This helps to guide and deflect the flow containing no fuel in the first intake port channel upwards towards the roof of the combustion chamber and the flow containing fuel in the second intake port channel downwards towards the center of the combustion chamber thus enhancing the effect of envelope stratification.

The partition wall may conveniently be formed as a separate component which is inserted into the intake port, the location of the twisted insert being indexed relative to the intake port such that its orientation is accurately defined inside the intake port.

In GB Patent Application No. 9505894.7 the fuel injector must be positioned some distance away from the cylinder head and it can only be directed at the floor of the intake port and not at the intake valve head. By contrast, in the present invention, the fuel injector may be targeted at the intake valve as in a conventional engine such that the quality of fuel preparation related to cold start, engine warm up and transient fuel control is not compromised.

If desired, a similar twisted second partition wall may be mounted in the branch of an intake manifold leading to the intake port to occasion an earlier rotation through 90° of the two gas streams. The effect of this would be that the gases that start at the top of the intake port are transferred to the bottom and vice versa.

For convenience, the two partition walls may be formed as a single continuous component which is inserted into the intake port. A fuel spray from a fuel injector directed from above the second partition wall will still be able to reach the intake valve without impinging on first or the second partition walls. This embodiment is particularly relevant when the connection of the first intake port channel with the first manifold is positioned near the bottom of the intake port.

BRIEF DESCRIPTION OF THE DRAWINGS

The invention will now be described further, by way of example, with reference to the accompanying drawings, in which:

FIG. 1 is a schematic perspective view of one intake port of an internal combustion engine, FIG. 2 is a similar view of a matching intake port to be used in conjunction with the port of FIG. 1 in an engine having two intake valves per cylinder, FIG. 3 shows the intake ports of FIGS. 1 and 2 when located side by side one another.

DETAILED DESCRIPTION OF THE PREFERRED EMBODIMENTS

Figure 4:
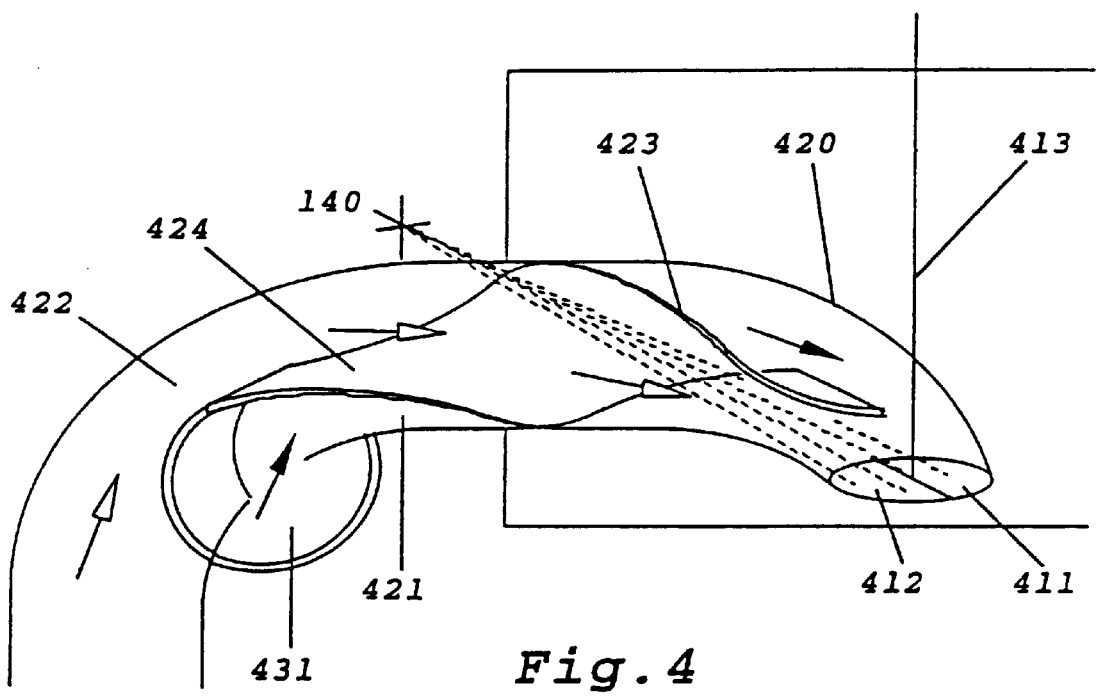
FIG. 4 shows the intake port of FIG. 1 connected to a branch of an intake manifold that is also designed to rotate the gas streams supplied to an intake valve.

FIG. 1 shows an intake port 120 that terminates in an intake valve 113 and opens onto the side face of a cylinder head designed to mate with an intake manifold. The port 120 has an internal partition wall 123 which is twisted. At the end nearer the intake valve 113, the plane of the wall 123 is perpendicular to the axis of the valve stem 113 and at its other end the partition wall is vertical or parallel to the stem of the intake valve 113.

The partition wall 123 divides the intake port 120 into two helical channels 121,111; 122,112 of equal cross-sectional area. The channels start off at their ends 121 and 122 side by side one another and end near the intake valve 113 one above the other. It is possible for both channels to be connected to a common supply manifold, but in the preferred embodiment of the invention, separate manifold branches are connected to the two channels and supply gases of different composition and at different flows. The lower channel 112 always receives air and fuel while the upper channel 111 contains no fuel and may comprise either air alone, EGR gases or a mixture of the two. As a further possibility, crankcase gases and purge vapors can be added into the upper channel 111. The shape of the combustion chamber and the intake port channels is designed to promote envelope stratification. The gases from the lower channel 112 are directed towards the center of the combustion chamber and travel relatively slowly while the gases from the upper channel 111 are directed at higher speed towards the roof of the combustion chamber and tumble in unison with the gases from the lower channel to form concentric horizontal cylinders having fuel in the inner cylinder and no fuel in the outer cylinder.

Fuel is introduced into the lower helical channel from an injector positioned at the point 140 in FIG. 1 and aimed at the head of the intake valve 113. Because of the twist in the partition wall 123, there is a direct line of sight from the point 140 along the lower channel to the head of the intake valve 113 and it is possible to direct the fuel spray such that it may reach the combustion chamber without significantly wetting the walls of the intake channel nor the partition wall 123.

FIG. 2 is essentially the same as FIG. 1 except that it is a mirror image. To avoid repetition, each reference numeral has been augmented by 100 in respect of components serving the same function. The point 140 is however the same point for both FIGS. 1 and 2 and if these two ports are those of a cylinder 100 having two intake valves as shown in FIG. 3 then a single fuel injector arranged at the point 140 can supply both intake ports without causing wall wetting in either.

FIGS. 1, 2 and 3 require the branches of the two intake manifolds to be side by side one another, but in a practical embodiment the two manifolds will have rails or plenums that extend parallel to one another and parallel to the engine block. It is necessary when connecting the manifold rails to the appropriate helical channels not to obstruct the line of sight of the fuel injectors. FIG. 4 shows an arrangement by means of which this objective can be achieved.

In the case of FIG. 4 numbering in the 400 series has been used to refer to the port, partition wall, intake valve and port channels and all these are essentially the same as described in FIGS. 1 and 2 and need not be described further. The intake manifold has a branch leading to each intake port that is divided by a second twisted partition 424 into two part helical channels 421 and 422. The channel 421 opens into a first manifold rail 431 that supplies EGR gases to the upper channel 411 near the intake valve 413 while the other channel 422 is connected to the main air intake manifold leading to the intake throttle. The injector 140 can still see the head of the intake valve 413 and is not obstructed by the partition wall 423. The two partition walls 423, 424 may if desired be joined to another and constructed as a single helical insert.

It is important to maintain the correct orientation of the partition walls in the intake port and suitable index marks may be provided for this purpose if the shape of the port is such as to allow the partition wall to be inserted in different orientations.

I claim:

1. An intake system for an internal combustion engine, said system having a cylinder head, an intake port (120, 220,420) in the cylinder head controlled by an intake poppet valve (113,213,413) having a valve stem, and a twisted partition wall (123,223,423,424) in the intake port dividing the intake port into two helical channels (121,111,122,112; 222,212,211,211; 422,412,421,411), characterised in that the plane of the partition wall (123,223,423,424) at its end adjacent the intake valve (113,213,413) lies generally perpendicular to the stem of the intake valve (113,213,413) and the plane of the part of the partition wall (123,223,423,424) at the other end of the intake port lies generally parallel to the stem of the intake valve (113,213,413).

2. An intake system as claimed in claim 1, wherein the two channels (121,111,122,112; 222,212,211,211; 422,412, 421,411) are connected to two separate intake manifolds, each having a respective flow regulating valve.

3. An intake system as claimed in claim 2, wherein the first manifold, connected to the channel (121,111;221,211) lying on the side of the partition remote from the head of the poppet valve at the intake valve, is connected at its upstream end to a supply of a gas selected from one or more of air, EGR gas, crankcase gas, and purge vapours and the second manifold connected to the other channel (122,112;222,212) is connected at its upstream end to a supply of ambient air only.

4. An internal combustion spark ignition engine, wherein each engine cylinder has at least one intake valve (113) and each intake valve (113) is supplied by an intake port (120) divided by a partition wall (123) into two intake helical port channels (121,111;122,112), a first intake port channel (121, 111; 221,211; 422,411) being provided with means for supplying a first flow stream directed across the roof of a combustion chamber and the second intake port channel (122,112; 222,212; 422,412) being provided with means for supplying a second flow stream directed towards the center of the combustion chamber, the first flow stream being directed to separate the second flow stream from the roof of the combustion chamber as the two flows enter the combustion chamber and the two flows tumbling in unison to produce envelope stratification within the combustion chamber, the partition wall (123) divides the intake port into two channels of substantially equal flow cross sections, the partition wall (123) lies parallel to a stem of the intake valve at the entrance of the intake port (120), and twists progressively through substantially 90° to lie at right angles to the stem of the intake valve (113) at the end of the intake port (120) nearer the intake valve, and a fuel injector (140) is positioned to inject fuel to mix with gases entering the combustion chamber through the second intake port channel (122,112), the fuel spray of the injector being aimed to enter the intake port to one side of the partition wall (103) and to pass through the second intake port channel without significantly wetting the partition wall (123).

5. An internal combustion engine as claimed in claim 4, wherein the two intake helical port channels are separately connected to respective intake manifolds controlled by respective flow regulating valves, the first manifold being connected to supply a gas selected from one or more of air, EGR gas, crankcase gas, and purge vapor to the first channel and the second manifold being connected to supply to the second channel a metered air flow into which fuel is introduced to give a predetermined air to fuel ratio in the second intake port channel, means being provided for controlling the flow through the first intake port channel to supply a first higher velocity flow stream directed across the roof of the combustion chamber and means being provided to control the flow through the second intake port channel to supply a second lower velocity flow stream towards the center of the combustion chamber.

6. An internal combustion engine as claimed in claim 5, wherein the shape of the twisted partition wall is designed such that it wraps around the expanding geometry of the fuel spray without the fuel wetting the surface of the partition wall.

7. An internal combustion engine as claimed in claim 4, having two intake valves per cylinder, the intake ports supplying the two intake valves being joined at one end and a single fuel injector being mounted in the plane of symmetry of the joined section of the intake port to deliver a fuel spray towards both intake valves.

8. An internal combustion engine as claimed in claim 4, wherein the partition wall is formed as a separate component that is inserted into the intake port.

9. An internal combustion engine as claimed in claim 8, wherein the location of the twisted partition wall is indexed relative to the intake port such that its orientation is accurately defined inside the intake port.

* * * * *